United States Patent
Thomas

[11] 3,721,310
[45] March 20, 1973

[54] SAFETY BRAKE SYSTEM FOR VEHICLES

[76] Inventor: Dalton A. Thomas, Route One, P.O. Box 97, Alpine, Ala.

[22] Filed: Dec. 16, 1971

[21] Appl. No.: 208,678

[52] U.S. Cl. .................................. 180/111, 242/54
[51] Int. Cl. ........................................... B60t 7/12
[58] Field of Search............ 242/54, 147, 75.5, 75.51; 180/111, 112; 73/95; 200/61.17

[56] References Cited

UNITED STATES PATENTS

| | | | |
|---|---|---|---|
| 2,990,903 | 7/1961 | Stingel et al. | 18/111 |
| 2,734,590 | 2/1956 | Hays, Jr. | 180/111 |

Primary Examiner—Robert G. Sheridan
Assistant Examiner—George H. Libman
Attorney—Hugh P. Carter et al.

[57] ABSTRACT

A frame movable to a first position when brakes are applied and a second position when brakes are released with resilient means urging the frame toward said second position. A reversible power unit and winch is carried by the frame and a circuit connects the power unit to a source of power to drive the winch in a direction to apply brakes and release brakes selectively whereupon the frame moves to said first position and said second position, respectively. A door actuated switch is in series with said circuit and a limit switch interrupts said circuit upon movement of said frame to said first position.

10 Claims, 4 Drawing Figures

INVENTOR.
Dalton A. Thomas

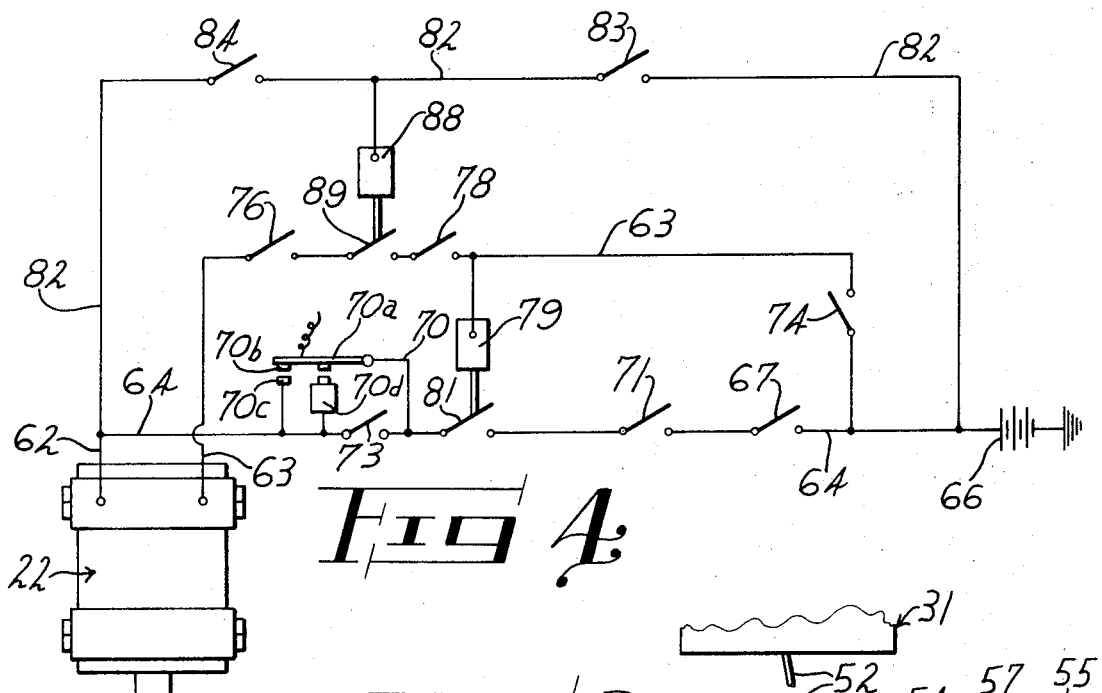
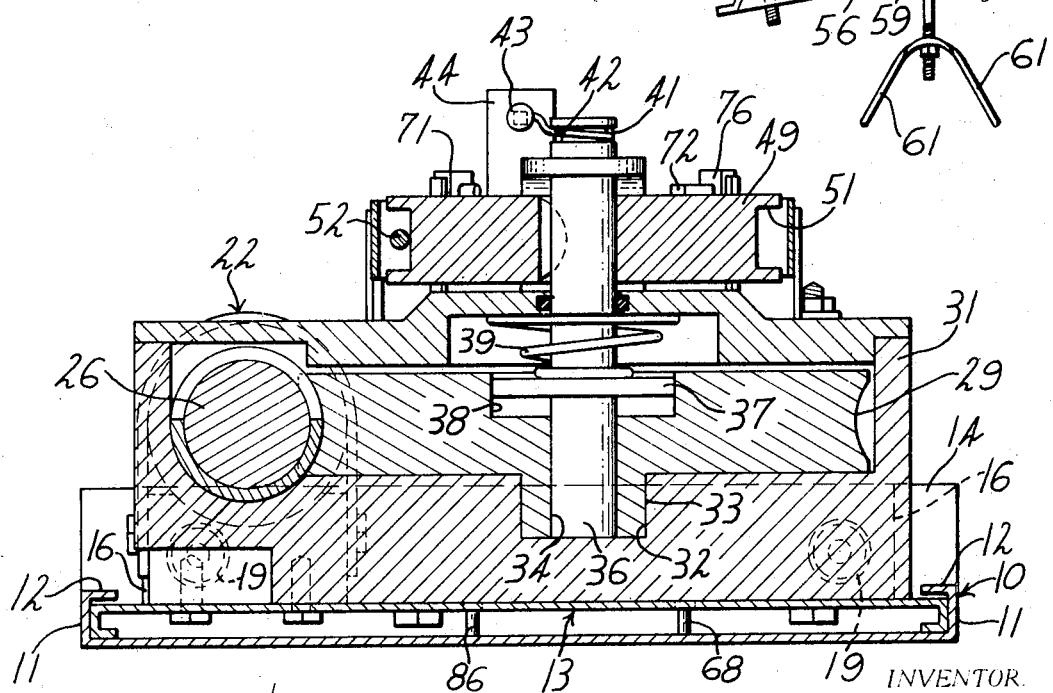

SAFETY BRAKE SYSTEM FOR VEHICLES

BACKGROUND OF THE INVENTION

This invention relates to a safety brake system for vehicles and more particularly to such a system wherein the brakes are applied automatically in response to opening the door of the vehicle with the ignition switch turned off and/or the gear selector member for the vehicle being in a non-motion position, such as the neutral position.

As is well known in the art to which my invention relates, many accidents occur due to the fact that operators of vehicles often fail to apply the emergency brake upon leaving the vehicle. That is, the operator of the vehicle turns off the ignition switch and then forgets to apply the emergency brake prior to leaving the vehicle. This not only can cause injury to the operator of the vehicle as he leaves the vehicle but also causes damage and injury to property and persons due to the fact that the vehicle often commences rolling after the operator has left the vehicle, especially where the vehicle is parked on a slightly inclined or sloping surface.

BRIEF SUMMARY OF THE INVENTION

In accordance with my present invention, I provide means for automatically applying the emergency brake in response to opening the door for the vehicle while the ignition switch is off or while the gear selector for the vehicle is in a neutral position.

A power unit and winch is mounted on a movable frame adapted for movement to a first position when the brakes are applied and to a second position when the brakes are released. A circuit connects the power unit to a source of power to drive the winch in a direction to apply brakes as the frame moves toward said first position. A door actuated switch is in series with the circuit and a limit switch interrupts the circuit upon movement of the frame to said first position. The brake is released automatically when the ignition switch is turned on and the gear selector is in a motion position.

Apparatus embodying features of my invention is illustrated in the accompanying drawings, forming a part of this application, in which:

FIG. 2 is a sectional view taken generally along the line 2—2 of FIG. 1;

FIG. 3 is a fragmental view showing a conventional type brake actuating member operatively connected to my improved safety brake system; and, FIG. 4 is a diagrammatic view showing a wiring system which may be employed with my improved brake system.

Figure 1:
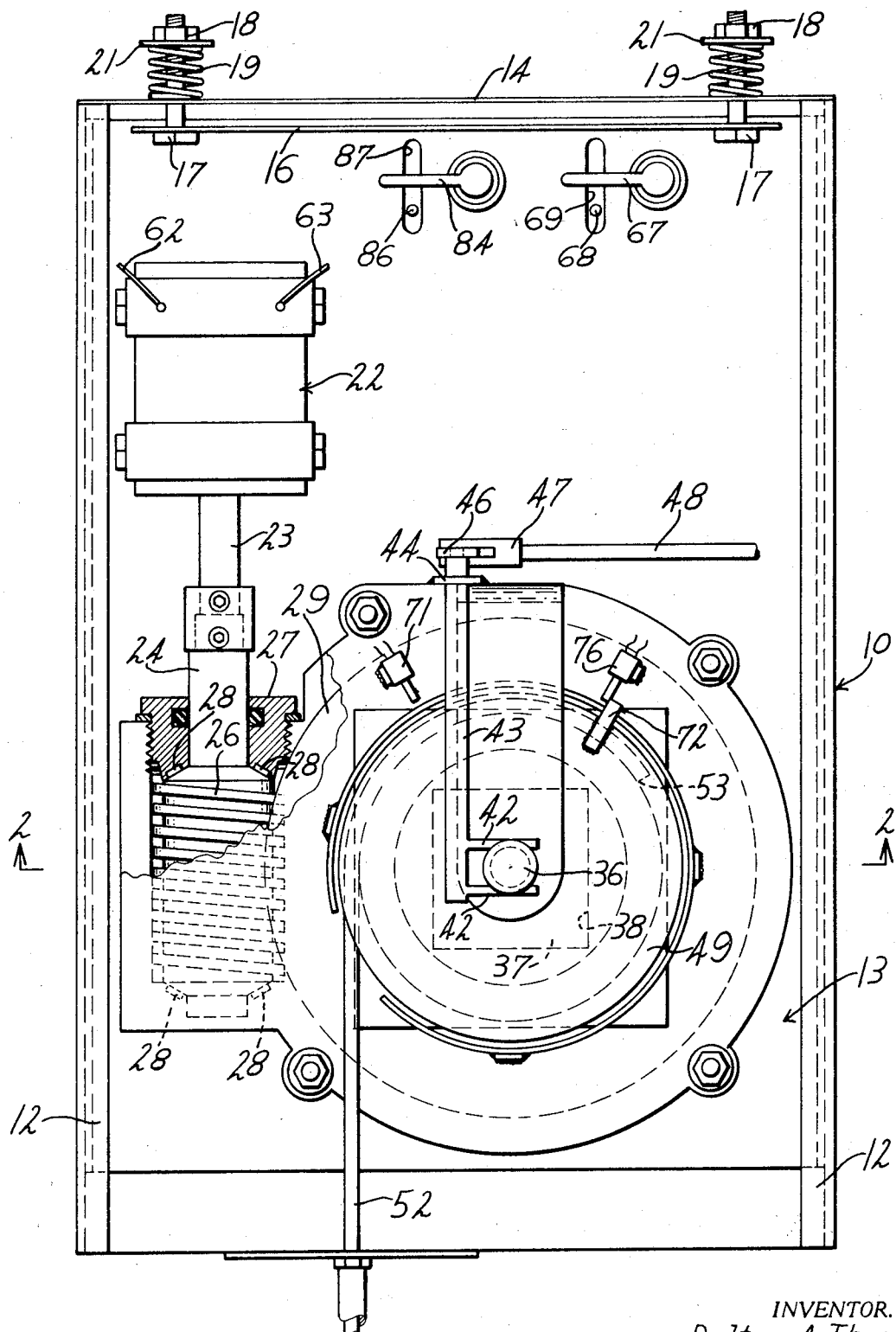
FIG. 1 is a top plan view, partly broken away and in section showing my improved safety brake system for vehicles.

Referring now to the drawings for a better understanding of my invention, I show a supporting frame 10 which is secured rigidly to the vehicle by suitable means, not shown. The supporting frame 10 is provided with upstanding sides 11 which are formed integrally with inturned flanges 12, as shown in FIG. 2, to provide longitudinally extending, channel-like guides. Mounted for longitudinal movement on the supporting frame 10 is a movable frame 13.

One end of the supporting frame 10 is turned upwardly to provide an upstanding flange 14. Secured rigidly to the end of the movable frame 13 adjacent the upstanding flange 14 is an upstanding flange 16. Extending through suitable openings provided in the upstanding flanges 14 and 16 are laterally spaced bolts 17 having retaining nuts 18, as shown in FIG. 1. Surrounding the bolt 17 intermediate the upstanding flange 14 and the nuts 18 are compression springs 19 and washer elements 21 with the washer elements being adjacent the nuts 18. The compression springs 19 thus urge the movable frame 13 toward the upstanding flange 14 carried by the supporting frame 10.

Mounted on the movable frame 13 is a reversible power unit 22, such as a reversible, electric motor. The power unit 22 is provided with a drive shaft 23 which is connected to a shaft 24 which carries a worm gear 26. The shaft 24 and worm gear 26 are mounted in a suitable housing 27 and is supported by suitable bearings 28. The worm gear 26 meshes with a gear 29 which is mounted for rotation in a suitable housing 31, as shown in FIG. 2. The housing 31 is provided with a recess 32 therein for receiving a reduced diameter, bearing sleeve member 33 formed integrally with the gear 29 whereby the gear 29 is rotatably supported.

As shown in FIG. 2, the gear 29 is provided with a centrally disposed opening 34 therein for receiving a shaft 36 with a rotatable fit. Secured non-rotatably to the shaft 36 is a rectangular member 37 which slidably engages a rectangular recess 38 provided in the upper surface of the gear 29. Surrounding the shaft 36 between the rectangular member 37 and the upper, inner surface of the gear housing 31 is a compression spring 39 which urges the shaft 36 and the rectangular member 37 carried thereby downwardly whereby the rectangular member 37 connects the shaft 36 non-rotatably to the gear 29 while the rectangular member 37 is within the recess 38. An annular recess 41 is provided adjacent the upper end of the shaft 36 for receiving a fork-shaped lifting member 42 which is carried by an elongated arm 43, as shown in FIG. 1. The arm 43 is adapted for rotation in a suitable bearing bracket 44 and one end of the arm is secured rigidly to a depending link 46. The lower end of the link 46 is pivotally connected to a cleavis member 47 which in turn is secured to an actuating rod 48. Accordingly, upon pulling the actuating rod 48 toward the right, as viewed in FIG. 1, the fork-shaped lifting member 42 is elevated to thus lift the shaft 36. Upon releasing the actuating rod 48, the spring 39 returns the shaft 36 and the rectangular member 37 to driving position relative to the gear 29. That is, while the rectangular member 37 is moved to an upper position, it moves out of engagement with the recess 38 whereby the shaft 36 is disconnected from the gear 29.

Mounted non-rotatably on the shaft 36 is a winch 49 having an outwardly opening annular recess 51 therein for receiving a flexible cable 52. One end of the cable 52 is secured to the winch 49 as at 53, as shown in FIG. 1. The other end of the cable 52 is connected to a brake actuating member indicated generally at 54. As shown in FIG. 3, the brake actuating member 54 may comprise a lever arm 56 which is pivotally connected to a vehicle frame 55 by a pivot pin 57. The outer end of the lever 56 is connected to a threaded member 58 which in turn is connected to the flexible cable 52. Pivotally connected to an intermediate portion of the lever 56 is a rod member 59 which in turn is adjustably connected to a pair of rearwardly extending cable-like members 61 which are operatively connected to the brake units for the rear wheels of the vehicle. That is, the rearwardly extending flexible members 61 are in the form of conventional type members which actuate the emergency brakes for vehicles. That is, the cables 61 are operatively connected by mechanical means to the brake shoes whereby the brakes are actuated upon moving the flexible cable 61 forwardly relative to the rear wheels. In view of the fact that such brake actuating apparatus is well known in the art to which my invention relates, no further description thereof is deemed necessary.

Power is supplied to the power unit 22 to drive the unit in a forward direction by a line 62. Power is supplied to the power unit 22 to drive the same in a reverse direction by a line 63. That is, upon energizing the line 62, the power unit 22 is driven in a direction to cause the winch 49 to rotate in a direction to wind the flexible cable 52 thereon to thus pull the cable 52 and the end of the lever 56 forwardly whereby the brakes are applied by the brake actuating member 54 in the usual manner. Upon deenergizing the line 62 and energizing the line 63, the power unit 22 is driven in a reverse direction to thus cause the winch 49 to rotate in a counterclockwise direction, as viewed in FIG. 1, to thus release the brakes.

Power is supplied to the line 62 by a line 64 which is connected to a battery 66. A limit switch 67 is connected in series with the line 64 whereby circuit to the power unit 22 is interrupted upon movement of the movable frame 13 a predetermined distance away from the upstanding flange 14. The limit switch 67 is carried by the movable frame 13 whereby it is adapted to engage a stop member 68 carried by the supporting frame 10 upon a predetermined amount of movement of the movable frame relative to the stationary frame. An elongated slot 69 is provided in the movable frame 13 for receiving the stop 68, as shown. A second limit switch 71 is in series with the line 64 in position to be actuated to interrupt the circuit through line 64 in response to a predetermined amount of angular movement of the winch 49. An outwardly projecting stop 72 is carried by the winch 49 in position to actuate the switch 71 upon said predetermined angular movement of the winch.

A door actuated switch 73 is also in series with the line 64 whereby the circuit through the line 64 is completed in response to opening the door of the vehicle. The door actuated switch 73 is a conventional type switch element which is closed as the door for the vehicle is opened. As shown in FIG. 4, a holding circuit by-passes switch 73 after switch 73 is closed, whereby the brakes are applied even though the switch 73 is closed momentarily and is then opened. The holding circuit comprises a branch line 70 connected to a movable member 70a having a contact point 70b adapted to move into engagement with a contact point 70c which in turn is connected to the line 64. An electro magnet 70d is connected to the line 64 whereby, upon closing switch 73, with switches 67, 71 and 81 closed, the movable member 70a is drawn toward the magnet 70d thus moving contacts 70b and 70c into engagement with each other. Member 70a is spring biased away from 70c whereby the contacts 70b and 70c are separated upon opening either of the switches 67, 71 or 81.

As shown in FIG. 4, the line 63 is connected to the battery 66 through the ignition switch for the vehicle, indicated at 74. A limit switch 76 is in series with the line 63 and is operable to interrupt the circuit through line 63 in response to a predetermined amount of angular movement of the winch 49 in a reverse direction. The stop member 72 carried by the winch 49 engages the switch 76, as shown in FIG. 1, to limit counterclockwise rotation of the winch 49. As the winch 49 is rotated in a counterclockwise direction, as viewed in FIG. 1, the tension on the compression springs 19 is released and the movable frame 13 moves toward the upstanding flange 14 to thus move the switch element 67 to the position shown in FIG. 1. A switch element 78 is in series with the line 63 and is closed in response to movement of the gear selector member of the vehicle to a motion setting. That is, upon movement of the gear selector member from neutral or park position to a motion setting, circuit is completed by the closing of switch element 78.

As shown in FIG. 4, the line 63 is connected to a switch actuator member 79, such as an electrical solenoid. The movable element of the solenoid 79 is connected to a switch element 81 which is in series with the line 64 whereby line 64 is interrupted upon completing the circuit through line 63. Accordingly, upon energizing the circuit through line 63, the line 64 is automatically deenergized by the switch actuator member 79.

The battery 66 is also connected to the line 62 by a line 82 having a manually operable releasable switch element 83 therein. The switch element 83 is of a push-button type whereby the circuit is energized so long as the button is pressed. A limit switch element 84 is also in series with line 82 and is operable in response to movement of the movable frame 13 to a predetermined position away from the upstanding flange 14 carried by the stationary, supporting frame 10. That is, the limit switch 84 is carried by the movable frame 13 in position to engage a stop member 86 which is carried by the supporting frame 10. An elongated slot 87 is provided in the movable frame 13 for receiving the stop member 86, as shown. The line 82 is connected to a switch actuator member 88, such as an electrical solenoid. The movable element of the solenoid 88 is operatively connected to a switch element 89 which is in series with the line 63 so that the line 63 is deenergized upon energizing the line 82.

In the event the electrical system becomes inoperative or for some reason the winch 49 cannot be rotated by the power unit 22, the brakes may be released by moving the actuator rod 48 to the right, as viewed in FIG. 1. Upon movement of the actuator rod 48 to the right, the elongated member 43 is rotated to thus lift the fork member 42 whereupon the shaft 36 is elevated to a position whereby the rectangular member 37 is out of engagement with the recess 38. In this position, the shaft 36 is free to rotate relative to the gear 29 whereupon tension on cable 52 is released to thereby release the emergency brakes in the usual manner.

From the foregoing description, the operation of my improved safety brake system for vehicles will be readily understood. Upon turning the ignition switch 74 off, circuit to the solenoid 79 is broken whereupon the switch element 81 is closed. Since the winch 49 is in brake released position at this time, the switch element 67 and the limit switch 71 are both closed. Upon opening the door of the vehicle, switch element 73 is closed thus completing circuit to the power unit 22 whereupon the winch 49 is driven in a direction to wind the cable 52 onto the winch to thus apply the brakes to the rear wheels of the vehicle by the brake actuator assembly 54. As the brakes are applied, tension is applied to the springs 19 and the movable frame 13 moves away from the upstanding flange 14 until the limit switch 67 engages the stop 68, thus breaking the circuit to the power unit 22.

The line 64 is deenergized until the ignition switch 74 is closed and the gear selector switch 78 is moved to closed position by moving the gear selector element to a motion setting. The limit switch 76 is closed at this time since the stop member 72 is out of engagement with switch element 76. Upon closing the ignition switch 74, the solenoid 79 is energized to thus open switch 81 and thus interrupt the electrical circuit through line 64. Upon completing the circuit through line 63, the power unit 22 rotates in a reverse direction to thus unwind the cable 52 from the winch 49 whereby tension on the cable 52 is released whereupon the emergency brakes are released in the usual manner. Upon rotation of the winch 49 a predetermined angular distance in the reverse direction, the stop member 72 engages the switch element 76 to thus open switch 76 whereupon the circuit through line 63 is interrupted with the brake in released position.

When it is desired to actuate the emergency brake system by the push button 83, while the brakes are in released position, circuit is completed directly from the battery 66 to the line 62 since switch 84 is closed while the movable frame 13 is in the brake released position. When the push button 83 is pressed while the gear selector member is in a moving position and the ignition switch 74 is on, the brakes will release immediately upon release of the push button. However, if the gear shift selector member is in neutral or park position, the brake will remain on after release of the push button until the gear selector member is moved to a motion setting with the ignition switch 74 on, whereupon circuit is then completed through switch element 78 to thus complete the circuit through line 63. It will be noted that while line 82 is energized by the push button 83, the solenoid 88 opens switch element 89 whereby line 63 is deenergized while line 82 is energized.

From the foregoing, it will be seen that I have devised an improved safety brake system for vehicles. By providing mechanism whereby the opening of the vehicle door will automatically apply the emergency brakes, I eliminate entirely the changes of a vehicle being left without the emergency brake being applied. My improved apparatus is trouble-free in operation since the opening of the door will not cause the brake to be applied while the ignition switch is closed. While the push button switch 83 will cause the brake to be applied without the ignition switch being in the off position or without the car being out of gear, the brakes will not remain on after the push button is released unless the ignition switch and/or the gear selector switch 78 is open. Furthermore, where it is desired to release the brake manually and independently of the electrical system, the operator merely pulls the actuator rod 48 to thus move the shaft 36 and the rectangular member 37 carried thereby out of engagement with the gear 29 whereby the winch is free to release tension on the cable.

While I have shown my invention in but one form, it will be obvious to those skilled in the art that it is not so limited, but is susceptible of various other changes and modifications without departing from the spirit thereof.

What I claim is:

1. In a safety brake system for a vehicle having a door, a brake actuating member, and an ignition switch:
   a. a supporting frame carried by said vehicle,
   b. a movable frame mounted on said supporting frame and movable relative thereto to a first position when the brakes are applied and to a second position when the brakes are released,
   c. resilient means restraining movement of said movable frame toward said first position and disposed to move said movable frame toward said second position upon release of the brake,
   d. a reversible power unit mounted on said movable frame,
   e. a winch mounted on said movable frame and having a cable extending therefrom and operatively connected to said brake actuating member,
   f. means operatively connecting said power unit to said winch,
   g. a first electrical circuit operatively connecting said power unit to a source of power for driving said power unit and said winch connected thereto in a direction to move said brake actuating member to brake applying position whereupon said movable frame moves toward said first position,
   h. a door actuated switch in series with said first circuit completing said first circuit in response to opening said door, and
   i. a first limit switch in series with said first circuit and operable in response to movement of said movable frame to said first position to interrupt said first circuit.

2. A safety brake system as defined in claim 1 in which a second limit switch is in series with said first circuit and is operable to interrupt said first circuit in response to a predetermined amount of angular movement of said winch.

3. A safety brake system as defined in claim 1 in which a second electrical circuit operatively connects said power unit to a source of power for driving said power unit and said winch connected thereto in a reverse direction to move said brake actuating member to brake release position.

4. A safety brake system as defined in claim 3 in which a limit switch is in series with said second circuit and is operable to interrupt said second circuit in response to a predetermined amount of angular movement of said winch in said reverse direction.

5. A safety brake system as defined in claim 3 in which said second circuit is in series with said ignition switch and a switch element which is closed in response to movement of a gear selector member to a motion setting.

6. A safety brake system as defined in claim 3 in which said second circuit is connected to a switch actuator member which in turn is connected to a switch element in series with said first circuit so that said first circuit is interrupted upon energizing said second circuit.

7. a safety brake system as defined in claim 1 in which a third electrical circuit operatively connects said power unit to a source of power for driving said power unit and said winch connected thereto in a direction to move said brake actuating member to brake applying position and a manually operable releasable switch element is in circuit with said third circuit for closing said third circuit.

8. A safety brake system as defined in claim 7 in which a limit switch is in series with said third circuit and is operable in response to movement of said movable frame to said first position to interrupt said third circuit.

9. A safety brake system as defined in claim 7 in which said third circuit is connected to a switch actuator member which in turn is connected to a switch element in series with said second circuit so that said second circuit is interrupted upon energizing said third circuit.

10. A safety brake system as defined in claim 1 in which said winch is releasably connected to said power unit and manually operable means is operatively connected to said winch for disconnecting said winch from said power unit so that said brake actuating member is releasable manually.

* * * * *